United States Patent [19]

Clark et al.

[11] 4,120,792
[45] Oct. 17, 1978

[54] COMBINED FILTER AND INCINERATOR

[75] Inventors: Dwight P. Clark, Tremonton; William F. Wagner, Brigham City, both of Utah

[73] Assignee: Thiokol Corporation, Newtown, Pa.

[21] Appl. No.: 824,575

[22] Filed: Aug. 15, 1977

[51] Int. Cl.² ............................................. C02C 3/00
[52] U.S. Cl. .................................. 210/152; 110/236; 210/67; 210/200; 210/209; 210/323 T
[58] Field of Search ............... 110/8 R; 210/63 R, 67, 210/68, 152, 200, 209, 323 T

[56] References Cited

U.S. PATENT DOCUMENTS

| 1,348,159 | 8/1920 | Down | 210/68 |
|---|---|---|---|
| 3,509,835 | 5/1970 | Dibelius et al. | 210/68 X |
| 3,655,048 | 4/1972 | Pergola | 110/8 R X |
| 3,944,487 | 3/1976 | Davis et al. | 210/68 X |

Primary Examiner—Charles N. Hart
Assistant Examiner—Richard W. Burks
Attorney, Agent, or Firm—Stanley A. Marcus; Edward E. McCullough

[57] ABSTRACT

An enclosure having an inlet and an outlet for hot air, and an inlet and an outlet for waste water, contains a plurality of refractory, porous, tubular, membrane-type filters, each of which is closed at one end and connected at its other end to the waste water outlet. Hence, waste water entering through its inlet in the enclosure must pass through the walls of the filter tubes before being discharged through its outlet. During this process, any solid particles in the water become deposited on the outer surfaces of the filter tubes. After a filtering cycle is over and the waste water has been drained through its outlet, a heating means, equipped with a blower and attached to the hot-air inlet, forces heated air into the enclosure to incinerate the solids deposited on the filter tubes. Therefore, the filter tubes serve also as refractory grates to hold the sludge while it burns. After the sludge has been burned, an automatic timer switches back to the filtering cycle.

10 Claims, 4 Drawing Figures

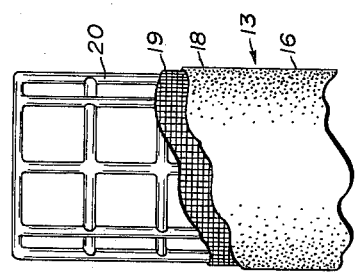
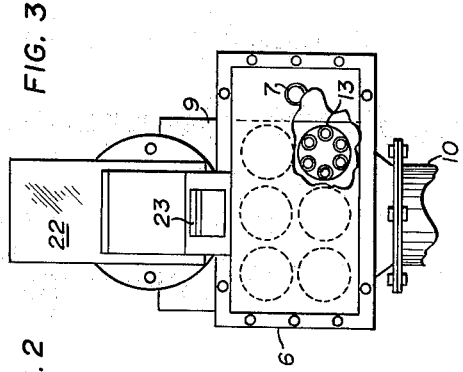
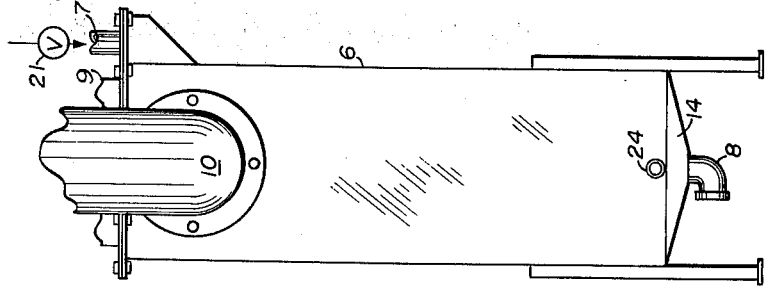
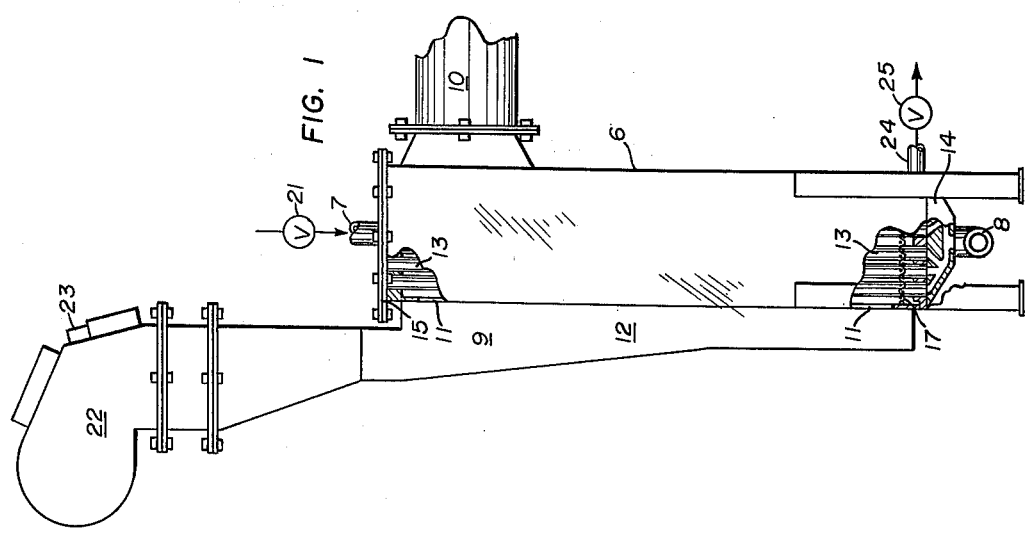

COMBINED FILTER AND INCINERATOR

CROSS-REFERENCE TO RELATED APPLICATIONS

This application is somewhat related to Ser. No. 529,653, filed 4 Dec. 1974, titled "A Catalytic Filtering-Incinerating Process and Device," by Delmar B. Davis, et al., now U.S. Pat. No. 3,944,487, owned by the same assignee as the present invention.

BACKGROUND OF THE INVENTION

This invention relates to systems for removing solids from waste water. More specifically, it relates to apparatus for filtering out and incinerating such solids. The invention herein described was made in the course of or under Contract DOT-CG-12843-A with the U.S. Coast Guard.

Systems are known in the art for filtering solid materials from waste water, and for incinerating the resulting sludge. Such a system is described in the related application, cross-referenced above. In this system, a particulate filter bed of special, porous materials intercepts solid particles as waste water is flowed through it. Subsequently, hot, oxidizing gas is forced upwardly through the filter bed, incinerating the solid particles of waste material. U.S. Pat. No. 1,197,640 to H. Kriegsheim describes a similar, catalytic filter bed, but it cannot also be used as an incinerator. U.S. Pat. No. 3,509,835 to N. R. Dibelius, et al describes a combined filter and incinerator wherein the filter portion is a particulate bed.

The particulate beds, which comprise the filter-grates of these prior-art devices, have a number of disadvantages that are overcome by the present invention: (1) The oxidizing gas must be forced through the bed under considerable pressure, so that all parts thereof may be exposed to incineration; (2) For optimum incineration, this pressure should be variable, since considerably greater pressure is required initially, when the bed is wet and heavy with sludge; and (3) The entire filtering and incinerating process tends to be slow and wasteful of energy, because of the excessive time required for drainage, heating and cooling of the particulate bed.

SUMMARY OF THE INVENTION

The present invention solves these problems by providing a combined filter and incinerator having filter-grates of a membrane-type. The sludge is deposited on the outer surface of thin, tubular membranes, and is later incinerated by flowing hot air over the surfaces of the membranes. Because of the much lower mass of filtering means, heating, cooling, and drainage require very little time; and excessive pressure of the oxidizing gas is not required—its input velocity can be regulated simply for optimum and uniform incineration of the deposited sludge.

The refractory enclosure of the invention has inlet and outlet ports for hot air, and inlet and outlet ports for waste water. A plurality of porous, refractory filter-grates within the enclosure have the form of elongated, parallel tubes, each closed at one end and connected at its other end to a manifold that is connected to the waste water outlet. Hence, waste water entering through its inlet port must pass through the walls of the filter-grates before being discharged through the waste water outlet port. In this process, any solids suspended in the water are deposited on the external surfaces of the filter-grate tubes.

After a given period of time has elapsed, the waste water is turned off at the inlet port and is allowed to drain thoroughly from the outlet port. Then a burner or other source of heat, equipped with a blower, forces hot air into the enclosure through the hot air inlet port, which is substantially coextensive with the length of the filter-grates. The hot air inlet port is tapered in a downstream direction to provide a substantially uniform velocity of hot air throughout the length thereof. When this hot air has thoroughly incinerated the sludge on the filter tubes, which now function as grates to hold the burning sludge, the burner is turned off and, after a short cooling period, waste water is again introduced into the enclosure.

The primary object of the invention is to provide a compact unit, especially suitable for use on ships, wherein the same filters capable of entrapping solid particles from waste water are also capable of serving as refractory grates for holding the resulting sludge while it is incinerated. Important features of the invention, are its simplicity of design and reliability.

Other objects and advantages of the invention will become apparent as the following detailed description is read with reference to the accompanying drawings. The same parts are designated by the same numbers throughout the disclosure.

BRIEF DESCRIPTION OF THE DRAWINGS

In the drawings:

FIG. 1 is a side elevation of the invention;

FIG. 2 is similar to FIG. 1, but is rotated 90°;

FIG. 3 is a top view of FIG. 2; and

FIG. 4 is a fragmentary view of one embodiment of a filter-grate, showing its construction when the primary filter menas is a refractory cloth.

DESCRIPTION OF THE PREFERRED EMBODIMENTS

As shown in FIG. 1, the invention has an elongated enclosure 6 having an inlet port 7 and an outlet port 8 for waste water, and an inlet port 9 and an outlet port 10 for hot air. These ports are all simply pipes connected to openings in the enclosure 6, except for the hot air inlet port 9, which connects to a long slot 11 in the wall of the enclosure. Also, the pipe 12 that connects to the slot 11 is tapered to accelerate the hot air in a downstream direction, so that the velocity of the hot air entering the enclosure 6 will be substantially uniform throughout the length of slot 11. Alternatively, the hot-air, inlet port 9 may be a pipe that communicates with an opening in the lower portion of the enclosure 6, A plurality of long, membranous, tubular filter-grates 13 are fixed in parallel, spaced-apart relationship inside the enclosure 6, so that one end of each is closed by a plate 15 while the other end is connected to a manifold 14. This manifold is, in turn, connected to the waste water outlet port 8. Hence, waste water entering the enclosure 6 through its inlet port 7 must pass through the walls 16 of the filter-grates in order to be discharged through the port 8. In the process, any solid particles in the water are deposited on the outside surfaces of the filter-grates 13.

A screen 17 in the lower portion of the enclosure 6 catches any solid material that may fall from the filter-grate surfaces.

Although other refractory, porous materials may be used for the filter-grates 13, the inventors' experiments have revealed that two types of materials and construction are especially successful in withstanding the corrosive waste materials and high temperatures encountered in the combined filter and incinerator.

One type of filter-grate is made of woven cloth of high-purity, silica fibers 18 supported on ⅛ to ¼ inch wire mesh 19 on an open support 20 of stainless steel or other refractory material (See FIG. 4). This cloth is sold under the trade name, "Refrasil," by Hitco Materials Division, Armco Steel Corp., of Gardena, Calif.

Another type of filter-grate is made of sintered metal of special, refractory alloys, preferably of Hastelloy C-4 and Inconel 625. They are manufactured so that the average pore diameter ranges from 40 to 60 microns. Resistance to corrosion of these metals is greatly enhanced by a passivation process consisting of heating the resulting filter-grates to 2,000° F. in a 30% carbon monoxide, 70% carbon dioxide atmosphere for one hour. This creates a uniform oxide coating on the metal.

Hastelloy C-4 is sold by the Cabot Corporation of Kokomo, Indiana, and is the trade name for an alloy of the following materials, in approximate percentages by weight: nickel (67), chromium (15-16.75), molybdenum (14-15.75), iron (1.00 max.), manganese (0.3 max.), tungsten (0.5 max.), silicon (0.05 max.), carbon (0.02 max.), and titanium (0.35-0.65).

Inconel 625 is sold by the International Nickel Co., Inc., of Huntington, West Virginia, and is the trade name for an alloy of the following materials, in approximate percentages by weight: nickel (58), chromium (20-23), iron (5 max.), molybdenum (8-10), columbium and tantalum (3.5-4.15), carbon (0.10 max.), manganese (0.5 max.), silicon (0.5 max.), phosphorus (0.015 max.), sulfer (1.0 max.), aluminum (0.40 max.), titanium (0.40 max.), and cobalt (1.0 max.).

After a period of filtering time has elapsed, during which an optimum amount of sludge has collected on the outer surfaces of the filter-grates 13, the flow of waste water is turned off at the inlet port 7, by means of a valve 21, and all water is allowed to drain out of the outlet port 8. The time period for the filtering cycle is dependent on a number of variables, such as gallons of flow of waste water per minute, concentration of solids therein, and total surface area of the filter-grates.

When the water has been thoroughly drained from the enclosure 6, a source of hot air, in the form of an oil burner and blower 22, is turned on by means of a switch 23 or automatic timer. The forced hot air that enters the enclosure 6 heats the interior to about 1,100° to 1,200° F. This incinerates the sludge thoroughly in about 45 minutes. The burner and blower 22 are then turned off. After a short cooling time (about 30 min.), the filtering cycle is again turned on.

An auxiliary outlet 24, equipped with a valve 25, is provided in the wall of the enclosure 6, just above the manifold 14. By this means, the waste water may be drained back into a holding tank (not shown) after a sufficient amount of sludge has collected on the filter grates 13. This speeds the entire process by making it unnecessary for all of the waste water to pass through the filter grates before the incineration cycle can begin.

An invention has been described that constitutes a valuable advance in the art of sewage treatment. Although the embodiments have been described specifically with regard to detail, it should be noted that many details may be altered without departing from the scope of the invention, as it is defined in the following claims.

The invention claimed is:

1. A combination filter and incinerator for waste water treatment, comprising:
    an enclosure having inlet and outlet ports for hot air and inlet and outlet ports for waste water;
    at least one porous, tubular, refractory, filter-grate in the enclosure, closed at one end and connected at the other end to the waste-water outlet port, so that waste water entering the enclosure from the inlet port must pass through the walls of the filter-grate in order to be discharged through the waste water outlet port, whereby solid particles in the waste water become deposited on the outer surface of the filter-grate;
    a source of forced, hot air, connected to the hot air, inlet port, and capable of incinerating solid waste particles on the filter grate; and
    means for alternately introducing waste water and heated air into the enclosure.

2. The combination filter and incinerator of claim 1 wherein the filter-grate is made of sintered, nickel-based alloy selected from the group consisting of "Hastelloy C-4," alloy, as herein defined, and "Inconel 625," alloy, as herein defined.

3. The combination filter and incinerator of claim 2 wherein the pores in the filter-grates range in average diameter from about 40 to about 60 microns.

4. The combination filter and incinerator of claim 2 wherein the filter-grates are coated with oxide.

5. The combination filter and incinerator of claim 1 wherein the filter-grate comprises an open support covered with a tube of woven silica-fiber cloth.

6. The combination filter and incinerator of claim 1 wherein the outlet port for the waste water is at the bottom of the enclosure, and further including a screen in the lower portion of the enclosure to intercept solid particles that may fall from the filter-grates.

7. The combination filter and incinerator of claim 1 wherein there is a plurality of filter-grates, and further including a manifold that connects the open end of each filter-grate to a common outlet port.

8. The combination filter and incinerator of claim 1 wherein the filter-grates are hollow, circular cylinders.

9. The combination filter and incinerator of claim 1 wherein the filter-grates are elongated, parallel tubes and wherein the inlet port for hot air is a slot substantially parallel and coextensive with the length of the filter-grates, and further including an inlet pipe, open to the full length of the inlet port, and tapering in a downstream direction to provide an approximately uniform input velocity of hot air throughout the length of the inlet port.

10. The combination filter and incinerator of claim 1 wherein the source of hot air is an oil burner, equipped with a blower, capable of heating the incinerator to temperatures from about 537° C. to about 650° C. (1,100° F. to 1,200° F.).

* * * * *